United States Patent [19]

Sienkiewicz et al.

[11] 3,999,474
[45] Dec. 28, 1976

[54] APPARATUS FOR PRODUCING A MEAT ANALOG

[75] Inventors: Boleslaw Sienkiewicz, Pearl River; William Joseph Meyer, Orangeburg; Joseph Giacone, Elmsford, all of N.Y.

[73] Assignee: General Foods Corporation, White Plains, N.Y.

[22] Filed: Sept. 10, 1973

[21] Appl. No.: 395,793

[52] U.S. Cl. .................. 99/467; 99/483
[51] Int. Cl.² .............................. A23J 3/02
[58] Field of Search .......... 426/249, 362, 364; 198/162, 160, 165; 99/339, 345, 348–349, 357, 353, 423, 443 R, 443 C, 450, 450.2, 467, 470, 483, 485, 537

[56] References Cited

UNITED STATES PATENTS

| | | | |
|---|---|---|---|
| 2,879,163 | 3/1959 | Anson | 426/364 |
| 3,674,504 | 7/1972 | Lane | 99/339 |
| 3,736,862 | 6/1973 | Crommelijnck | 99/353 |

*Primary Examiner*—Leonard D. Christian
*Assistant Examiner*—Alan Cantor
*Attorney, Agent, or Firm*—Thaddius J. Carvis; Daniel J. Donovan

[57] ABSTRACT

An improved apparatus is provided for economically producing meat analog products. According to the invention, at least one slurry comprising oil, water and coagulable protein is continuously mixed and layered. The layered slurry is heat set under moist heat to provide a cohesive mass without surface product drying. The heat set product is then sliced for marketing as is, or after subjecting it to varying degrees of frying. The preferred product is a partially fried bacon analog product.

4 Claims, 5 Drawing Figures

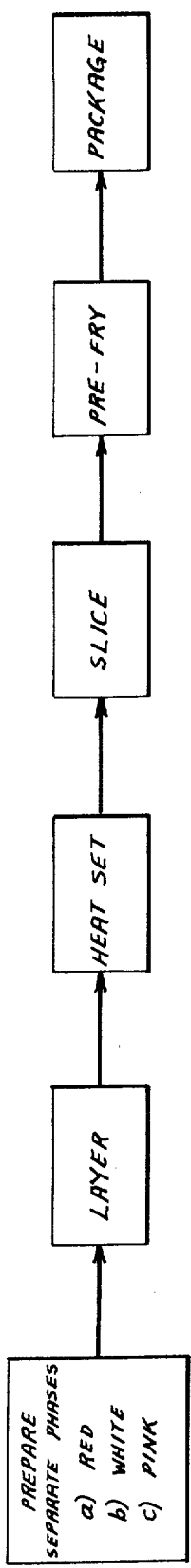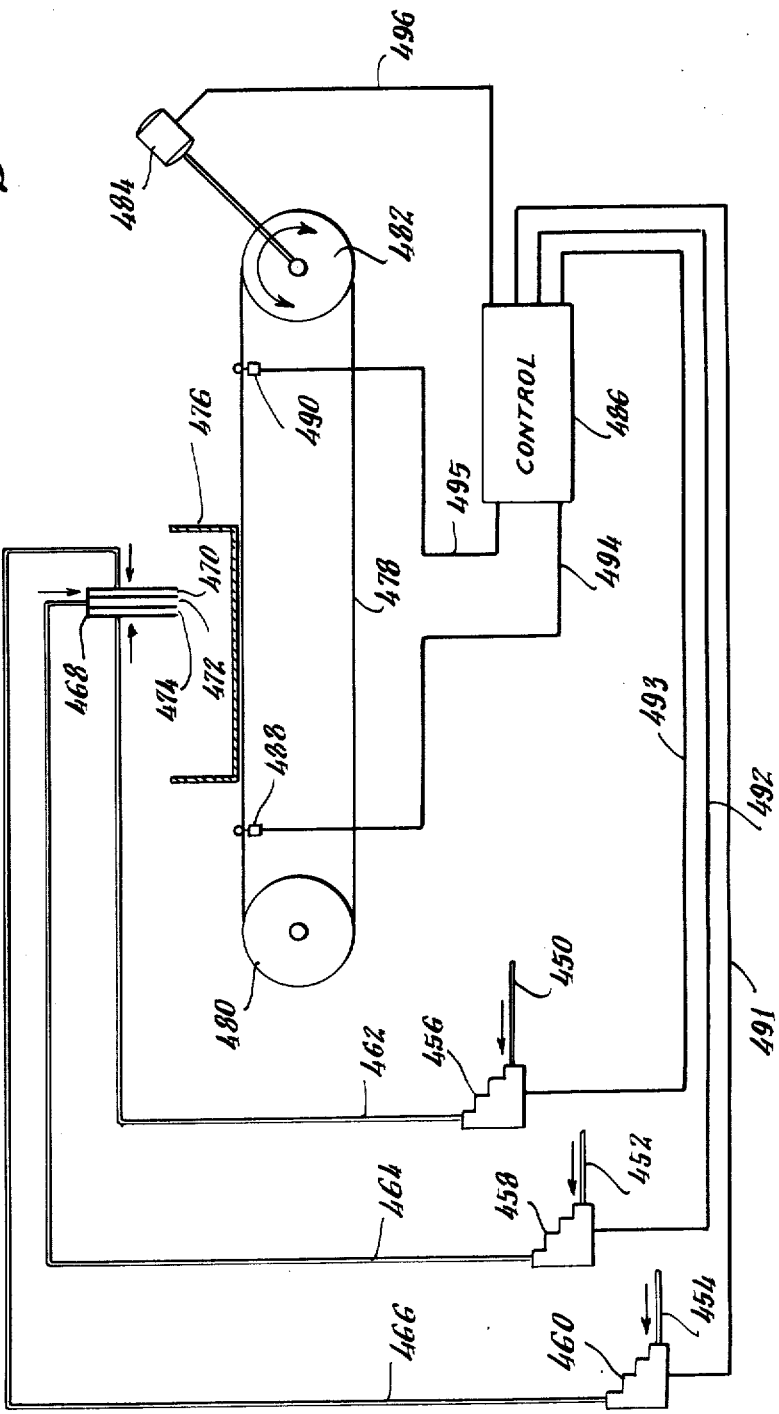

APPARATUS FOR PRODUCING A MEAT ANALOG

BACKGROUND OF THE INVENTION

This invention relates to an apparatus for preparing simulated meat products; especially those such as bacon, having distinct lean and fatty appearing regions.

In recent years, considerable research has focused upon developing new-technology for producing meat-like, protein-containing foods from various vegetable and animal protein sources. Economics provides a major incentive. It would clearly be advantageous to substitute the more efficient process of growing vegetable proteins for the rather inefficient process in which animals convert proteinaceous vegetable materials into meat. This is especially true where the ever-increasing human population is feared to be outdistancing our ability to provide grazing land for meat-producing animals. Moreover, recent efforts have also been directed to avoiding certain natural products. For example, evidence suggests the possibility that saturated fat and cholesterol should be avoided by some people for health reasons. Also, many people refuse to eat meat or meat by-products for religious reasons.

In U.S. application Ser. No. 236,982, (filed Mar. 22, 1972, now U.S. Pat. No. 3,840,677) assigned to the present assignee, there is described a bacon-like product and a method for preparing it. That product and method overcome many of the major shortcomings of prior art efforts. Following the disclosure of that application it is now possible to produce synthetic products that truly have texture, appearance, and flavor which are similar or equivalent to the natural products. The product disclosed in that application, in fact, effectively simulates the great external and textural differences which exist between the fatty and lean portions of bacon. And, this is accomplished without the need for spun protein fibers, largely relied upon by prior art workers to obtain the desired, meat-like texture.

While the product described in said Ser. No. 236,982 is extremely good, it can be prepared in only limited amounts by the labor intensive method described therein. And, to product it on a commercial scale by such a method would generate costs which would offset much of the economy sought to be achieved by the meat replacement. Accordingly, to best achieve the objects of that invention, it would be desirable to have a method and apparatus which could produce such a simulated meat product in large quantities with a minimum of manual labor.

SUMMARY OF THE INVENTION

It is, therefore, an object of the present invention to provide an improved apparatus for economically producing large quantities of simulated meat products.

It is another object of the present invention to provide an apparatus for economically producing large quantities of simulated meat products having distinct lean and fatty appearing regions.

It is yet another object of the present invention to provide an apparatus for continuously layering and heat setting large quantities of simulated meat products.

It is a yet further object of the present invention to provide an apparatus for prefrying or precooking a meat analog product in large quantities while controlling the amount of product crinkle.

These and other objects are accomplished by the present invention which provides an improved apparatus for preparing simulated meat products having distinct lean and fatty appearing regions, which operates in its broader aspects by a) preparing at least one slurry comprising oil, water and heat coagulable protein; b) applying at least one layer of said slurry to a moving surface to form a layered mass; and c) subjecting the layered mass to moist heat to coagulate said heat coagulable protein in said layered mass without removing significant amounts of moisture from the layered mass.

In another aspect of the invention, the layered, heat-set mass is sliced and subjectd to a frying operation. Excessive crinkle of the product during frying is prevented by placing one side of the individual slices, in non-overlapping relation, in contact with a first surface; placing the surface of a hold down member in contact with the sides of the slices opposite those in contact with said first surface, the weight of said hold-down member being supported by said slices in such a manner that the degree of crinkle of said slices during heating is restricted. The slices are then heated, while maintained between said first surface and said surface of the hold-down member, to reduce the moisture content of said slices to about 15% or less depending upon the degree of cooking desired.

BRIEF DESCRIPTION OF THE DRAWINGS

The invention will become more apparent from ensuing discussion, especially when read in connection with the attached drawings wherein:

FIG. 1 is a flow chart indicating the general, preferred process sequence for preparing a partially fried bacon analog product, FIG. 5 is a schematic representation of an alternative embodiment of a layering device for preparing a meat analog in accordance with the present invention.

DETAILED DESCRIPTION

Figure 2:
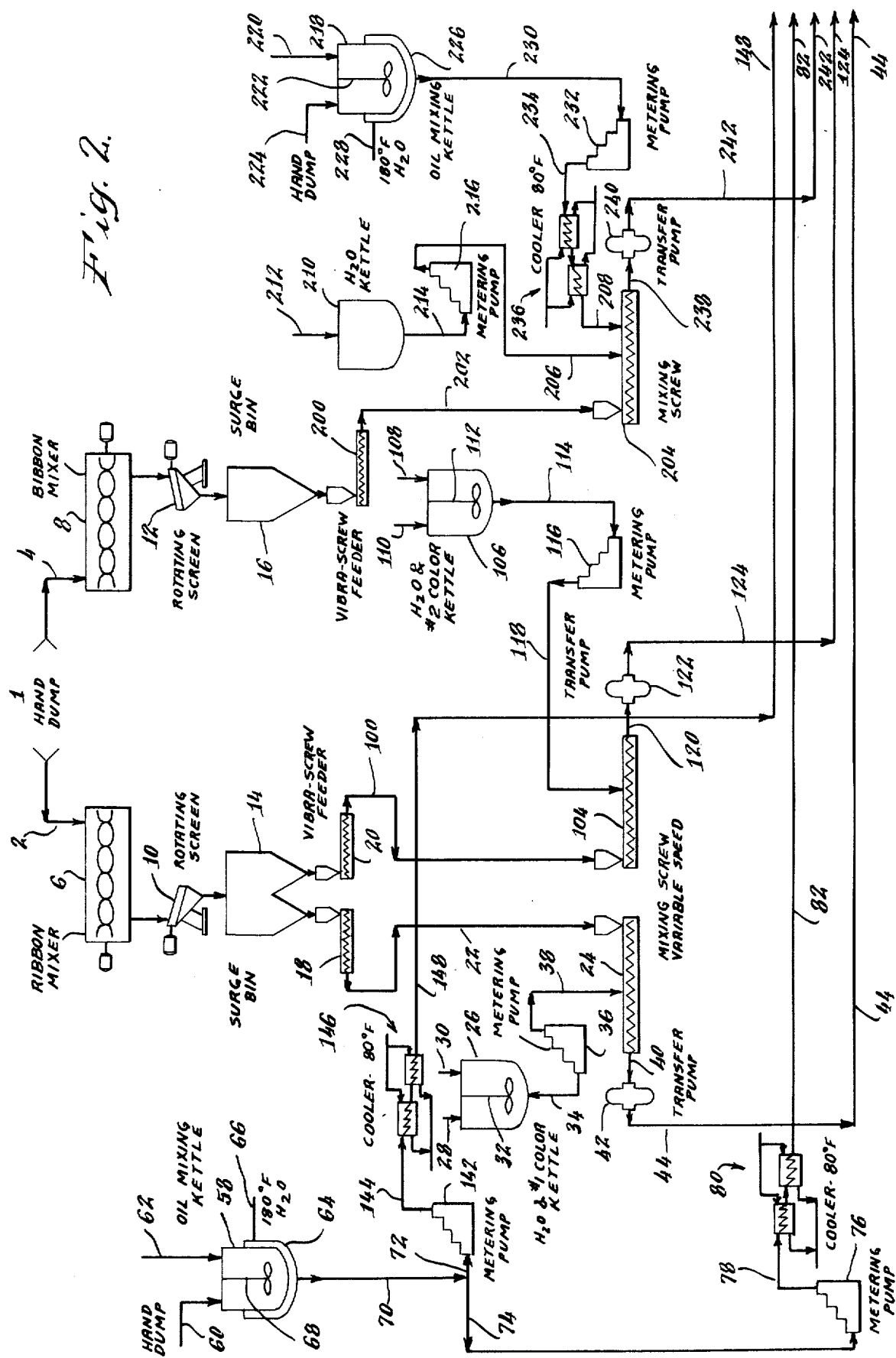
FIGS. 2–4 are schematic representations of a preferred apparatus for preparing a meat analog in accordance with the present invention.

The apparatus of the present invention can produce a wide variety of meat-like products. Among the most notable of these are products simulating bacon, ham, and sandwich steaks. However, other meat products, especially those wherein it is desired to have distinct lean and fatty portions with a fried texture, can also be prepared. And, it is further within the contemplation of the present invention to produce protein products having desirable characteristics which do not simulate the flavor or appearance of any particular meat product.

For the purpose of conciseness in describing the present invention, the production of a bacon analog will be discussed as exemplary. The bacon analog can be marketed in a number of forms; all of which, in this exemplary situation, are meant to be consumed after processing to obtain the textural attribute of natural fried bacon.

Exemplary of the forms in which it can be marketed are: (1) a completely fried or ready-to-eat product; (2) a partially fried product ready for a final fry in oil; (3) a partially fried product having a light oil coating thereon to enable final heating to a fried texture in an ordinary home-type kitchen oven as well pan frying in oil; and (4) an unfried product, similar to raw natural bacon, requiring complete cooking before eating.

The third of these listed products is the preferred product form because it is light in weight, flexible enough to avoid breakage in transit, and can be prepared by the consumer in either a frying pan or oven. Accordingly, the following discussion will focus in detail on preparing this partially-fried, oil-coated bacon analog product. The embodiments of the present invention designed for the production of the other three listed product forms will also be discussed, but in less detail.

When fried, the products of the present invention may crinkle or curl much in the manner of natural bacon or other meat. The "curls" are seen as large bends or turns in the meat analog along a major portion of the length of an individual piece. The "crinkles" are seen as undulations, each extending only a short distance along the length of an individual piece. Usually, when fried, an individual piece will exhibit a number of these crinkles or undulations along its length.

Referring now to FIG. 1, there is seen a flow chart indicating the general process sequence for preparing a partially fried bacon analog product. According to this process it is necessary to first mix at least two, and preferably three, distinct slurries comprising water, fat, and heat coaguable protein, and having incorporated therein one or more protein fillers, colors, flavors, and the like. For other products, however, such as a bologna analog, only one slurry is necessary. The density and viscosity of the emulsions are controlled so that when the emulsions are combined and heat set, they will form a continuous loaf which, when sliced, has distinct phases which visually resemble the lean and fatty portions of natural bacon. When fried, the slices visually and texturally resemble natural fried bacon. Each slurry is prepared from ingredients selected to form uniform suspensions without large particles of materials visually apparent to the eye. Thus, all ingredients are either liquid; or where solid, are ground or otherwise treated to reduce particle size such that large particles are not apparent in the final product.

The white or fatty phase of the meat (e.g., bacon) analog is prepared from fat, water, and albumen, and may further contain a vegetable protein isolate, proteinaceous filler, flavors, colors and the like. The following table gives the proportions of materials necessary to produce a final fried product having a white phase which can be characterized as melting in your mouth and closely resembling the texture and flavor of the fried fatty part of bacon.

TABLE I

FATTY PHASE (White)

| Ingredients | % of Ingredients for Bacon Analog | |
|---|---|---|
| | Preferred | Range |
| Water | 29.7 | 20–39 |
| Fat | 34.0 | 30–50 |
| Albumen | 12.7 | 7–20 |
| Proteinaceous Filler | 8.6 | 0–20 |
| Spice mix* | 10.0 | 0–15 |
| Bacon and Maple Flavor* | 5.0 | 0–10 |
| | 100.0 | |

*contains approximately 99% fat.

It is important to control the final density and viscosity of the white phase prior to layering. To achieve the desired density and viscosity, it may be necessary to vary the water content from the above formulation.

An acceptable density shape, at about 80° F, is from about 0.85 to about 1.05 g/cc, and is preferably from about 0.95 to about 1.03 g/cc. Where the density is maintained within the preferred range, puffing and undue curl of the product during subsequent heating are minimized. Density is a measure of the gas or air incorporated in the white phase. The incorporation of gas in the white phase produces a lighter phase and a better meltdown on eating the fried product. However, where a higher density is desired it may be obtained by mixing under vacuum.

An acceptable viscosity will be within the range of from about 15 to 26, and preferably about 18 to 24, Brookfield units as measured on a Brookfield (Model HAT) viscometer at 2.5 rpm and 80° to 85° F using a "B" T-bar spindle mounted on a helipath.

The white phase is preferably prepared by mixing the ingredients in a screw-type mixer for a period of time sufficient to wet the materials and produce a uniform mix. From that point the mix is passed through a high shear device such as a centrifugal pump or an in line mixer to further work the mix to the point where a uniform, stable dispersion is formed wherein the fat is well emulsified.

In the meat analog produced by this invention, the distinct textural phases, lean and fatty, are preferably colored to correspond to the texture designed into each phase. Thus the fatty phase is normally a neutral or whitish color and the lean phase a reddish color. However, this is not critical. It may be desirable, as with a bacon-like product, to color some of the fatty phases within the bacon slice red to simulate the lean phase. This provides a leaner looking product which is preferred by the consumer, while retaining a texture simulating the fattier natural bacon products currently being marketed. However, the exact method of coloring the product is a matter of choice.

The lean phase (red or phase) of the meat (e.g. bacon) analog is prepared from fat, water, color and flavors, and a mixture of protein isolate and albumen, which may further contain proteinaceous fillers. The following table gives the proportions of materials necessary to produce a final fried product having a red phase, with a fiber-like chewiness resembling the texture and flavor of the fried, lean part of bacon.

TABLE II

LEAN PHASE (Red and Pink)

| Ingredients | % of Ingredients for Bacon Analog | |
|---|---|---|
| | Preferred | Range |
| Water | 52.4 | 40–65 |
| Albumen | 4.4 | 0–15 |
| Protein Isolate | 14.0 | 6–24 |
| Fat | 17.5 | 10–25 |
| Bacon & Maple Flavor* | 3.3 | 0–5 |
| Dry Spice Mix* | 7.4 | 0–10 |
| Red Color | 0.3 | 0.1–1 |
| Thickening agent | 0.7 | 0–2 |
| | 100.0 | |

*contains approximately 99% fat

The above lean phase formulation is intended to simulate the lean or meat portion of natural bacon. Its texture on frying is designed to produce a lean, meat-like texture and not to have the soft, melting properties of the white phase.

As with the white phase, it is important to control the final density and viscosity of the red phase prior to layering. To achieve the desired density, it may be necessary to vary the water content from the above formulation.

An acceptable density for this phase, at about 80° F, will be greater than about 0.85 g/cc, and preferably the red and pink phases should have densities of above 1.05 g/cc. Densities above 1.05 g/cc give a more meaty, chewy texture. Below this level the product has a more friable texture and approaches a potato-chiplike crunch.

An acceptable viscosity for the pink and red phases will be within the range of from about 4 to 15, and preferably from about 5 to 10, Brookfield units as measured on a Brookfield (Model HAT) viscometer at 2.5 rpm and 80° to 85° F using a B (1.435 inch) T-bar spindle mounted on a helipath.

Before the apparatus of the present invention, it was not possible to attain stable slurries necessary for continuous processing having the fat well emulsified and also attain the desired high density. However, by processing with the apparatus of the present invention, whereby excessive air is excluded during final mixing, it is possible to achieve the desired high densities without the previously associated problem of oil separation.

The lean phase is prepared by employing a suitable vegetable protein isolate, either as a frozen curd, freshly made or in dried form. The protein isolate, typically soy isolated at its isoelectric point and then adjusted to pH 6.2, is then blended with an aqueous color mix, the albumin and proteinaceous filler, preferably in a screw-type mixer of the kind employed for the white phase. Unlike the preparation of the white phase however, the oil phase, containing the oil and flavorings, is not admixed in the screw-type mixer. It has been found that admixing the oil at this point causes excessive incorporation of air and a resulting decrease in product density. The oil phase is added after mixing the other ingredients with water to form a water slurry. The combined mixture is further blended to a uniform consistency by means of a pump or other appropriate mixing device to form a stable, uniform suspension wherein the oil phase is well emulsified.

A third, pink, phase is prepared in the same manner as the red phase except that lighter red coloring is employed. The pink phase will thus provide, in the layered product, at least two distinctly colored meat-like layers which more nearly resembles natural bacon.

It is preferable that the protein material be ground to a size which is not visually apparent to the consumer once incorporated in our meat-like analog. If the filler is ground such that 90% of the material passes through a 45 mesh U.S. Standard Sieve and such that at least 80% passes through a 50 mesh U.S. Standard Sieve the proteinaceous filler particles are not visually apparent in either the unfried or fried meat analog when incorporated in the emulsion and heat-coagulated therein.

To prepare proteinaceous fillers for use in our analog, texturized vegetable protein or other suitable filler is conventionally ground in a Fitzpatrick hammer mill employing a ¼ inch or ⅜ inch screen, and then reground in an Alpine pin mill at a high speed setting. The exact method of grinding the filler is not presently believed critical, nor is the type of filler. Furthermore, experiments indicate the texture of the finished meat analog is better when a broad range of fine particle sizes is employed rather than narrow range of particle size — for example, those passing a U.S. 50 but retained on a U.S. 60 screen.

In our analog, 5% to 15% by weight of each phase consists of colors and flavoring agents. Selection of the type of flavoring agents employed is considered routine to one of ordinary skill in the art. Of course, the selection is important to render the bacon analog as close as possible in flavor to the natural fried product. Flavoring agents can include sugar, salt, pepper, HVP's, autolyzed yeast, MSG, nucleotides imitation and natural flavors, imitation and natural aromas, flavor enhancers, and the like.

As a fat source for the white phase, we prefer to employ a hydrogenated blend of soybean and cottonseed oil which has been fractionated and is sold as Durkex 500. For the red and pink phases, we prefer soybean oil sold as Crisco Oil. However, usually with slight modification, it is possible to use other fats and oils with equally good results. On a percentage basis, the white phase will contain about twice as much fat as the red and pink phases. Fats contemplated for use in either phase of the product of this invention would include hydrogenated, partially hydrogenated, and unhydrogenated vegetable oils such as safflower oil, corn oil, soybean oil, cottonseed oil, and the like; as well as animal derived fats such as fish oil, lard, etc., and mixtures thereof.

The relative amounts of the pink, red and white phases are not critical. Where a product is desired to resemble conventional bacon, the proportions are preferably about 17% pink, 42% red and 41% white. However, to improve the lean appearance of the analog, more red and pink can be employed. In actuality, any visually desirable combination of red and white phase may be employed and would depend upon the type of meat being simulated. For example, when simulating ham, the proportions might be 90% red, 10% white and no pink.

Once the distinct slurries have been prepared, they are sequentially expressed from fixed nozzles onto a moving surface to form a layered mass of distinct layers of red, pink and white slurries to simulate the stratification of bacon. The layered mass is then subjected to moist heat to coagulate the coagulable protein, sliced, and either fried or packaged directly.

While it was formerly thought to be necessary to heat-set the layered mass under high heat and elevated pressure (e.g. in an autoclave) to obtain an adequate set for the coagulable protein while not causing undue product expansion or surface moisture loss, it has now been determined in accordance with the present invention that moderate, moist heat at substantially atmospheric pressure will provide a good heat set. According to the present invention, humidified air is employed having a wet bulb temperature of from about 205° to about 212° F and a dry bulb temperature of from about 220° to about 280° F. Typically, heating should be for a time sufficient to raise the internal temperature of the layered mass to about 100° to 200° F, preferably about 190° F. It being surprising that this low pressure heating allows proper heating setting, but yet avoids the problem of undue product expansion. Expansion is, in fact, controlled to less than about 15%, preferably less than 10%.

As noted above, the heat-set product can be sliced and marketed as is, or it can be subjected to varying degrees of frying. The term "frying" is used herein mainly because this stage of production approximates the product qualities attained by frying natural bacon. The "frying" operation employed according to the present invention, need not be frying in the conventional sense of heating the product in hot oil, but includes various heating or cooking operations conducted at elevated temperatures (e.g., from about 300° to 400° F) which can reduce the product moisture content to the desired degree. The product of the present invention can be completely fried, to a moisture content of from about 2% to 8%, preferably 2% to 4%; but, preferably, the product is partially fried to reduce the moisture content to from about 10% to about 15%. The product should be sprayed or otherwise coated with oil prior to the production frying operation where it is to be marketed for final preparation by oven baking. However, where the product is to be marketed for preparation by pan frying, the oil treatment will be unnecessary because the consumer will add oil to the frying pan during home preparation.

A highly desirable feature of the bacon analog produced by the process and apparatus of the present invention is that it crinkles and curls much like natural bacon. However, while a degree of crinkle provides a pleasing appearance to the product, excessive crinkle and/or curl can produce processing difficulties both during the production frying and home pan frying operations.

Excessive "banana curl" type defects, which can cause packaging and appearance deficiencies, are largely avoided through formula and slurry processing optimization. However, even where the bacon analog does not form "banana curls," the crinkle-like undulations in the product may become so great that home pan frying in a shallow layer of oil leaves undercooked portions in areas which remain out of contact with the oil, despite turning. It was thought that pressing the pieces flat during the pre-fry would solve this problem, however, where the pieces are pressed flat during the pre-fry there would be a tendency for them to be excessively flat and lack some of their appeal as a substitute for natural bacon. Surprisingly, it was found that, simply by laying a wire mesh screen over the product during the pre-fry stage, and without applying any external pressure or clamping means, it is possible to prevent excessive crinkle while still allowing a natural bacon-like crinkle.

With the above general discussion as an aid to a better understanding of the invention, attention will now be focussed on a detailed description of the drawings.

Referring now specifically to FIG. 2, there is shown a schematic representation of a portion of a preferred apparatus of the present invention. All of the dry ingredients except for flavoring and coloring materials are hand dumped at 1 and conveyed by lines 2 and 4 to ribbon mixers 6 and 8 respectively where the ingredients are thoroughly mixed. From the ribbon mixers the dry mix is passed to rotating screen members 10 and 12 which remove large agglomerates before the dry mixes pass to surge bins 14 and 16 respectively.

The dry mix in surge bin 14 will be divided into two portions, for forming the red and pin phases, and fed by means of vibrating screw feeders 18 and 20 for feeding to the equipment for producing these distinct phases. The dry mix from feeder 18 is passed through line 22 to the variable speed mixing screw 24 where it is thoroughly mixed with the water containing sufficient color to produce a pin coloration in the final product.

To prepare the water containing the colorant, water is added to tank 26 through line 28 and dye is added to the tank a 30. After mixing by suitable means, indicated as stirrer 32 in the drawing, the water phase is passed through line 34 to metering group 36 and then through line 38 to the mixing screw 24.

Figure 3:
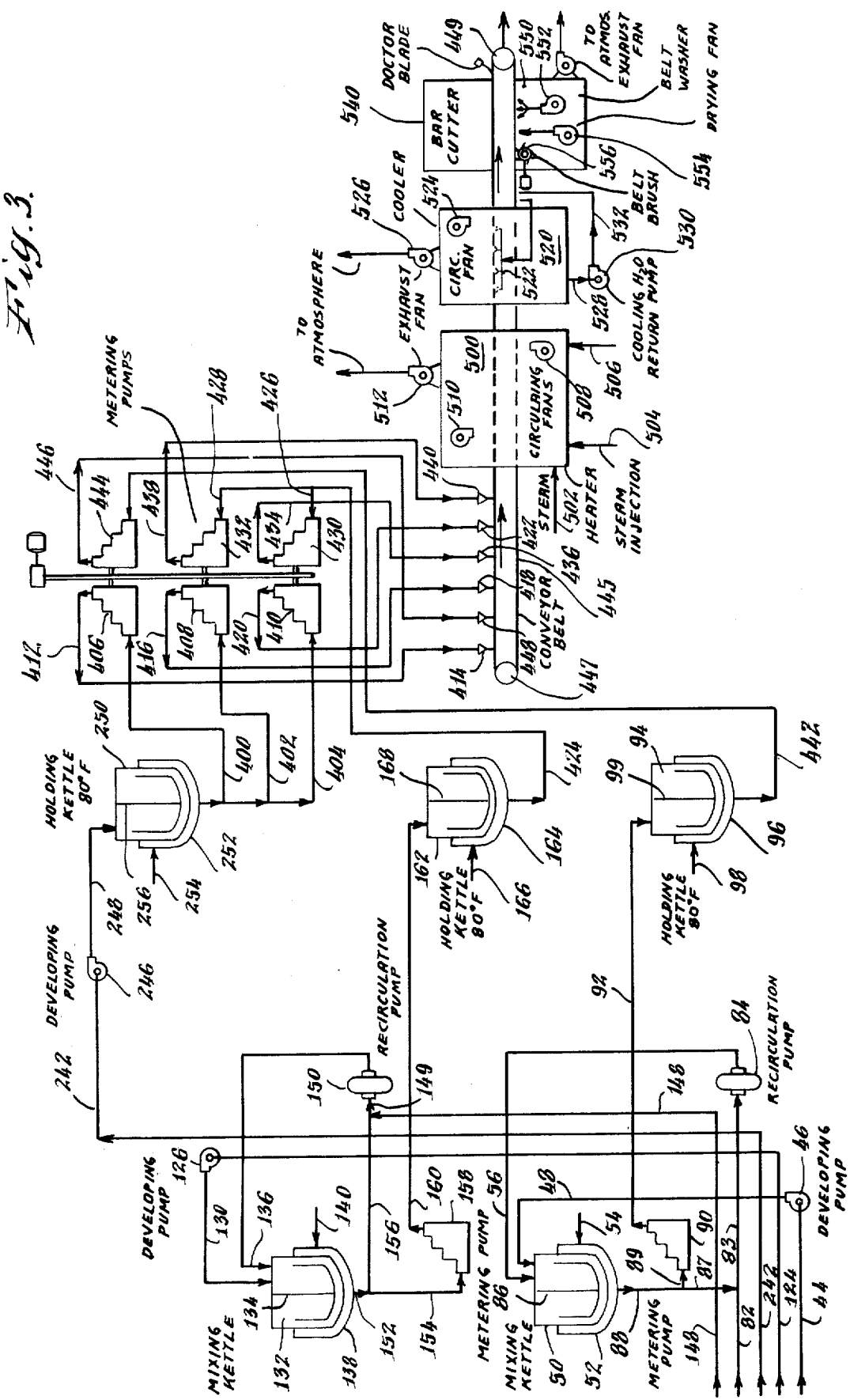

After sufficient mixing to provide a homogeneous water slurry, the slurry is passed from mixing screw 24 through line 40 to transfer pump 42 which passes the water slurry through line 44 to developing pump 46 (FIG. 3). The developing pump 46 is shown in this particular embodiment to be a centrifugal pump which provides high shear mixing to the water slurry before addition via line 48 to jacketed vessel 50. It is of course possible to use another suitable high-shear, in-line mixing device in place of developing pump 46. The slurry in vessel 50 is maintained at a temperature of about 80° F by heat transfer medium circulated through jacket 52 by line 54.

The oil phase for forming the pink phase slurry is prepared by admixing the oil at above its melting point, usually on the order of about 70° F, with oil soluble and dispersible flavoring materials in jacketed mixing vessel 58 (FIG. 2). The flavoring materials enter the vessel at 60 and the oil enters the vessel at 62. The contents of vessel 58 are maintained at about 120° F by circulating hot water through jacket 64 from line 66.

After thorough mixing by stirring means 68, the ingredients are passed from the vessel 58 by line 70. The oil stream in line 70 is split into two portions, one passing through line 72 for use in forming the red phase and the second portion passing through line 74 for forming the pink phase. The oil phase from line 74 is passed to metering group 76 which meters the flow of oil to the pink phase slurry processing.

From pump 76 the oil phase is passed through line 78 to heat exchanger 80 and then through line 82 which carries it to line 83 (FIG. 3) where it is admixed with slurry brought from vessel 50 via line 87. The admixture of oil phase and slurry in line 83 is then passed through recirculation pump 84, preferably a gear pump, which thoroughly disperses the ingredients and emulsifies the fat. This slurry, now containing emulsified fat, is then passed to vessel 50 via line 56 for thorough mixing with the contents of the vessel. Stirring means 86 in vessel 50 provides continued uniform dispersion of the slurry, thereby maintaining a stable dispersion of the ingredients wherein the oil phase is completely emulsified. It is important to operate this system such that the flow of materials into and out of vessel 50 be equalized to maintain an average residence time of from 5 to 30 min.; preferably, 10 to 20 min.

The now complete pink phase slurry is passed from mixing vessel 50 through line 88. This slurry is divided into two streams 87 and 89. Stream 89 goes to metering pump 90 which will meter the proper quantity of pink phase through line 92 to jacketed holding vessel 94. Stream 87, as noted above, is mixed with additional oil phase from line 82. In the vessel 94, the pink phase slurry is maintained at a temperature of about 80° F by hot water entering the jacket 96 via line 98. Stirring means 99 maintains the slurry under constant agitation while in the holding vessel 94.

Turning our attention now to the preparation of the red phase, it is seen that this phase is prepared in like manner to the pink phase. The dry mixture is fed from vibrating screw feeder 20 (FIG. 2) through line 100 to mixing screw 104 where the dry mix is thoroughly admixed with a water phase containing sufficient red colorant to provide a deep red coloration to the final product. The water phase is prepared in vessel 106 by adding water through line 108 and dye at 110 and vigorously agitating by stirring means 112. From vessel 106, the water phase passes through line 114 to metering pump 116 which meters the appropriate amount of the fluid for processing through line 118 into the variable speed mixing screw 104.

After completely mixing the water phase with the dry ingredients in mixing screw 104, the resulting homogenous water slurry is passed through line 120 to transfer pump 122 which transfers the mixture through line 124 to developing pump 126 (FIG. 3). The developing pump is shown in the drawings as a centrifugal pump which provides high shear in-line mixing; however, it is noted that other suitable high shear in-line mixers may be employed. From developing pump 126, the mixture is passed through line 130 into jacketed mixing vessel 132. The contents of mixing vessel 132 are maintained at a temperature of about 80° F by heat transfer medium fed to jacket 138 through line 140.

As indicated above, the oil phase for the red phase slurry is prepared in jacketed vessel 58 (FIG. 2) and passed via line 70 to line 72. From line 72 the oil phase is metered by metering pump 142 through line 144 to heat exchangers 146 and then to line 148. The oil phase is passed from line 148 to line 149 (FIG. 3) where it is admixed with slurry brought from vessel 132 via line 156. The admixture of the oil phase and slurry in line 149 is then passed through recirculation pump 150, preferably a gear pump, which thoroughly disperses the ingredients and emulsifies the fat. This slurry, now containing emulsified fat, is then passed to vessel 132 via line 136 for thorough mixing with the contents of the vessel. Stirring means 134 in vessel 132 provides continued uniform dispersion of the slurry, thereby maintaining a stable dispersion of the ingredients wherein the oil phase is completely emulsified. It is important to operate this system such that the flow of materials into and out of vessel 132 be equalized to maintain an average residence time of from 5 to 30 min; preferably, 10 to 20 min.

The now complete red phase slurry in kettle 132, wherein the oil phase is completely emulsified and dispersed within the water phase is drawn from vessel 132 via line 152, and is then split into two separate lines, 154 and 156. Line 154 feeds the red phase slurry to metering pump 158 which meters the red phase material through line 160 to jacketed holding kettle 162. The jacketed holding kettle 162 is maintained at a temperature of about 80° F by water fed to the jacket 164 through line 166. The red phase slurry is maintained under constant agitation in the kettle 162 by stirring means 168. And, as described above, the portion of stream 152 which passes through line 156 is combined with the oil phase from line 148. The admixture is then fed via line 149 through the recirculation pump 150 and into the mixing vessel 132 via line 136.

The white phase slurry is prepared in a manner generally similar to the red and pink phases, however, unlike the preparation of those phases, the oil phase can be admixed together with the water phase and dry mix directly in the variable speed mixing screw. In particular, referring again to FIG. 2 of the drawings, the dry mix is passed from surge bin 16 to vibrating screw feeder 200 which feeds the dry mix via line 202 to variable speed mixing screw 204 for mixing with the water from line 206 and oil phase from line 208.

The water for the white phase contains no coloring material, so it is merely fed into holding vessel 210 via line 212 for passage to metering pump 216 via line 214. Metering pump 216 meters the appropriate amount of water for the white phase slurry processing.

The oil phase for the white phase slurry is prepared in the same manner as that for the pink and red phase slurries. Thus, liquid oil is fed into jacketed mixing vessel 218 via line 220 and mixed by means 222 with flavoring materials supplied at 224. The contents of the mixing vessel are heated and maintained at a temperature of about 120° F by heat transfer medium circulated through jacket 226 from line 228. The required amount of the oil phase is drawn from vessel 218 via line 230 and metered to the process by metering pump 232. The oil phase is passed via line 234 to heat exchanger 236 where it is cooled to about 80° F.

After thorough mixing of the water, dry mix and oil phase by mixing screw 204, the resulting white phase slurry composition is passed via line 238 to transfer pump 240 and then to line 242. The white phase slurry composition is complete in this form and need only be further homogenized to form a stable dispersion wherein the oil phase is completely emulsified. This is accomplished by passing the slurry from line 242 to developing pump 246 (FIG. 3). The drawings indicate developing pump 246 as a centrifugal pump; however, other suitable, high-shear, in-line mixing devices can be employed. Such suitable, alternative devices are well known to those having ordinary skill in the art. From developing pump 246, the slurry is passed to jacketed holding vessel 250 wherein it is maintained at a temperature of about 80° F by water circulated to jacket 252 via line 254. And, the slurry is maintained under constant agitation by means 256.

All three slurries are now ready for layering. The preferred layering apparatus is that shown schematically in FIG. 3. According to this embodiment, all three phases are drawn from their respective holding vessels and sequentially expressed from a series of independent, fixed nozzles onto a continuously moving belt.

Specifically, the white phase slurry is drawn from holding vessel 250 and is split into three streams 400, 402 and 404 which supply the slurry to metering pumps 406, 408, and 410 respectively. Each of these pumps supplies the required amount of slurry to a layering nozzle or nozzle assembly. In this instance, pump 406 meters the slurry through line 412 to nozzle 414, pump 408 meters the slurry through line 416 to nozzle 418, and pump 410 meters the slurry through line 420 to nozzle 422.

In like manner, the red phase slurry is drawn from holding vessel 162 by line 424. The slurry in line 424 is split into two separate streams 426 and 428 which supply metering pumps 430 and 432 respectively. And, pump 430 meters the slurry via line 434 to nozzle 436, and pump 432 meters the slurry via line 438 to nozzle 440.

The pink phase slurry is drawn from holding vessel 94 by a single line 442 which supplies metering pump 444. The slurry is then metered via line 446 to nozzle 448 for layering.

All of the nozzles continuously express their respective slurries in sequential manner in the direction of movement of conveyor belt 445. The conveyor belt 445 itself is preferably at least surfaced with stainless steel or other like material. The belt is supported by at least two axially rotatable cylindrical means 447 and 449, and is driven by convention drive means, not shown. The belt 445 should be equipped with upstanding, flexible dam portions (not shown) along its edges to prevent outflow of the slurries layered thereon.

According to a preferred embodiment for producing a bacon analog, the belt 445, rotating in the direction shown, would receive a first layer of white phase slurry, followed by the pink phase slurry, another layer of the white phase slurry, a layer of red phase slurry, a third layer of white phase slurry, and an upper layer of red phase slurry. This procedure will yield a layered mass, which preferably will have about the following proportions of the various phases, from top to bottom as it is produced on the belt:

Red — 19.7%
White — 13.6%
Red — 22.2%
White — 9.9%
Pink — 17.3%
White — 17.3%.

The layering is preferably conducted at a temperature of about 80° F.

As another embodiment, the order of layering can be reversed. And, it has been unexpectedly determined that where a red or pink, instead of a white, layer is applied first, there is considerably less problem of the product sticking to the belt. And, in fact, no release agent, as is conventionally used, will be required.

After layering, the layered mass remains on conveyor belt 445 for passage through a heat-set chamber shown generally as 500 in FIG. 3. In the heat-set device 500, the layered mass is subjected to moist heat to coagulate the heat coagulable protein and thereby form a cohesive, solid mass. The moist heat is provided by supplying the chamber with hot air and steam to attain a wet bulb temperature of from about 205° to 212° F and a dry bulb temperature of from about 220° to 280° F within the chamber. Steam is supplied to chamber 500 by lines 502, 504, and hot air is supplied via line 506. The humidified hot air is circulated within the chamber by means of circulating fans 508 and 510. If desired a heat exchanger (not shown) may also be present within the chamber to heat the air.

In order to provide more accurate moisture control, the humidified air within the chamber 500 is continuously renewed, adding fresh steam and heated air as indicated and exhausting a portion of the humidified air to the atmosphere by means of exhaust fan 512. A slight positive pressure should be maintained within chamber 500 e.g., on the order of 1 to 3 inches of water, to assure against drafts entering the openings at the ends thereof.

After heat setting, the solidified mass is maintained on the conveyor belt 442 for optional passage through a cooling chamber 520 wherein cooling water is sprayed at the under surface of belt 445 at 522 and cooling air is circulated across the upper surface of the product via fan 524. The spent cooling air is exhausted to the atmosphere by exhaust fan 526. Spent cooling water is collected, exits the chamber via line 528 to pump 530 which directs the water through line 532 for re-cooling (by means not shown) and recycling to 522. The temperature of the solid product mass can thereby be reduced to within the range of from about 70° to 140° F.

Figure 4:
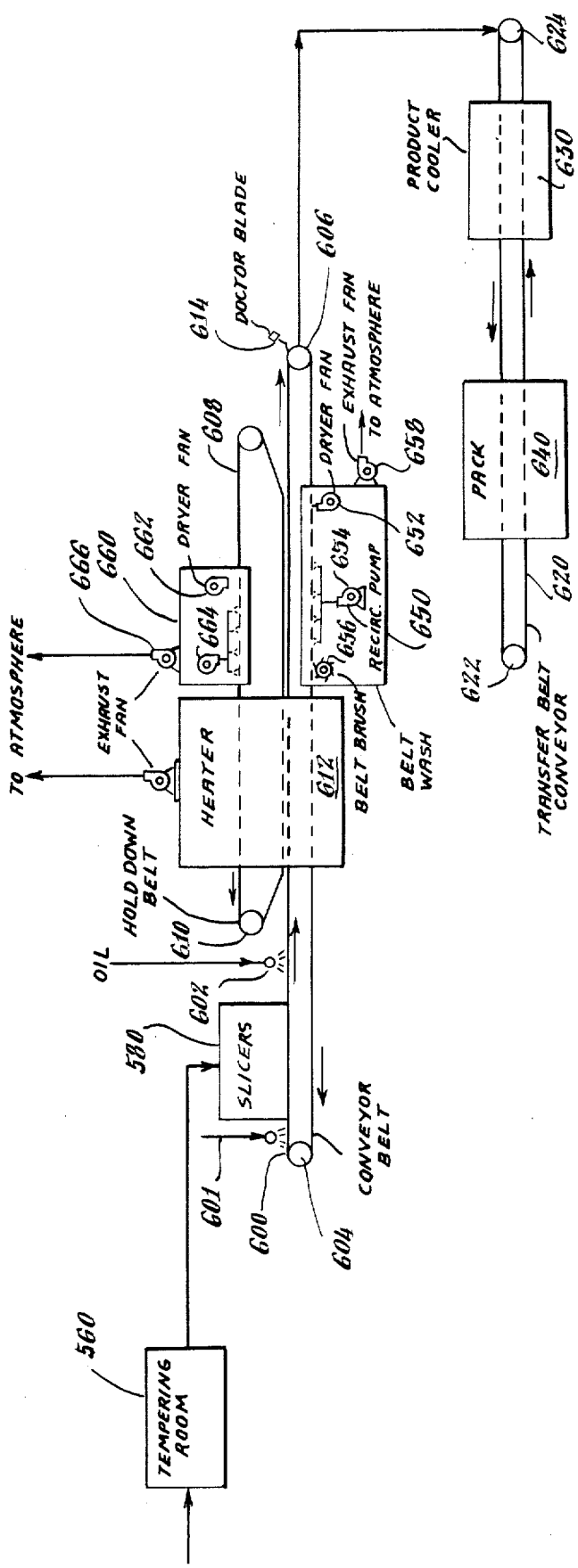

After cooling, if desired, the solid product mass is conveyed on belt 445 to cutting means 540. While the cutting means is designated in the figure as a bar cutter, any suitable means known to the art, such as wire cutters, which can devide the continuous product mass into easily handled portions, can be employed. After cutting, the product is removed from the conveyor and transported to an optical tempering room 560 (FIG. 4).

In the present embodiment, a belt washer 550 (FIG. 3) is shown positioned directly below the cutting means 540. It is of course possible to position this device at any suitable position along the belt 445 where space permits. The washer 550 is shown to include steam spray means 552, drying fan 554, and belt brush means 556 for removing stubborn, caked deposits.

The tempering room 560 is maintained at a temperature of about 50° F and a relative humidity of about 50%. The product is maintained in the tempering room for a period of time sufficient to reduce extreme temperature gradients within the product and bring the product temperature to a level effective for slicing, e.g. on the order of 50° to 140° F. Usually this requires a residence time of no greater than about 16 hours; and, the tempering room can be omitted entirely.

From the tempering room, the product is conveyed to a slicing machine 580. This machine can be of the kind typically employed for slicing natural bacon or other suitable design. The product is sliced into strips of less than about ⅛ inch, and preferably about 1/16 inch, thickness which are placed onto conveyor 600 in non-overlapping relationship. As noted above, the product can, if desired, be marketed in this form or subjected to varying degrees of frying before packaging.

In the preferred embodiment of the invention, the strips carried on the conveyor 600 are sprayed or otherwise coated on both surfaces with oil, amounting to about 5.5% by weight of the total product, before the pre-fry operation. As shown in FIG. 4, the belt 600 is sprayed with a mist of oil from oil spray means 601, positioned before slicer 580 in the direction of movement of the belt; and, the upper surface of the slices once placed on the belt receive a coating of oil by oil spray means 602. The conveyor 600, supported by at least two rollers 604 and 606, is typically of stainless steel sheet but may also be of open mesh construction.

After passing beneath the oil spray 602, the strips of product are contacted on their upper surface by a freely hanging hold-down belt 608, preferably made of about 4 to 8 mesh stainless steel. The belt 608 is supported by at least two rollers 608 and 610, at least one of which is driven by conventional drive means, not shown. Hold-down belt 608 lays against the upper surface of the product as it passes through pre-fry heater 612. The belt 608, by its own, free-hanging weight prevents undue product curl and crinkle which would ordinarily be caused by the pre-fry operation. The weight of the belt, freely hanging in this manner, is not so excessive as to cause imprinting of the product or to prevent a desirable degree of product crinkle, considered essential to consumer acceptance of the product.

In a preferred operation, 60% of the surface area of the belt 608 is covered by 1/16 inch thick product strips. Desirable crinkles, within the range of from about ⅛ inch to ⅜ inch high, are achieved by using a 4 mesh stainless steel belt weighing about 1.23 pounds per square foot.

The pre-fry heater 612 is heated by any conventional means (not shown) capable of providing a chamber temperature at the conveyor belt of from about 300° to 400° F. In the preferred embodiment, electrically powered infrared heaters of conventional construction are employed because of their efficiency. However, it is understood that infrared lamps, gas-fired infrared heaters or externally heated air could likewise be employed. The residence time within the pre-fry heater is typically in the order of about 1.25 to 1.5 minutes. The moisture content of the product is preferably reduced within the pre-fry heater 612 to a final level of about 10% to 15%.

After completion of the pre-fry, the product is removed from belt 600, with the aid of doctor blade 614, if necessary. The product is then conveyed to transfer conveyor belt 620, supported by at least two rollers 622 and 624, at least one of which is driven by conventional means not shown. Transfer conveyor belt 620 advances the product through a product cooler 620 where its temperature is reduced to about 70° F and then to a packaging station. After packaging and completion of quality control checks the product is ready for distribution and sale.

Referring back to conveyor 600 and hold-down belt 608 in FIG. 4, attention is focused on cleaning means 650 and 660. Cleaning means 650 cleans conveyor 600 by means of fan 652 which dries the belt, hot water spray means 654 and belt brush 656. The chamber is exhausted to the atmosphere by exhaust fan 659. Cleaning means 660 cleans hold-down belt 608 by means of fan 662 which dries the open mesh belt 608, and hot water spray means 664. Cleaning means 660 is exhausted to the atmosphere by exhaust fan 666.

An alternative embodiment for forming the layered mass is shown schematically in FIG. 5. According to this embodiment the white, red, and pink phase slurries are fed from their respective holding tanks 250, 162 and 94 (FIG. 3) via lines 450, 452 and 454 (FIG. 5) to metering pumps 456, 458 and 460, respectively. From the metering pumps the white, red and pink slurries are passed via lines 462, 464 and 466 to nozzle assembly 468 for expression from separate orifices 470, 472 and 474 respectively. The slurries are expressed one at a time and sequentially into container 476 which is conveyed by conveyor 478 under the fixed nozzle assembly 468. The conveyor 478 is supported by at least two rollers 480 and 482, and driven by reversible motor 484. The device is controlled by control means 486 in such a manner that a single layer of one of the slurries is applied as the container 476 makes a complete pass under the nozzle assembly 468. As the container reaches the end of a pass it trips one of the two limit switches 488 or 490 which causes the control means 486 to reverse the direction of the motor, stops the then operating metering pump, and starts a different metering pump. It is possible, by properly programming the control means 486 to apply any number of layers in any given order and to stop the applicartion altogether after a predetermined number of layers are applied. The control means 486, which is electrically connected to the layering equipment by electrical leads 491, 492, 493, 494, 495 and 496, is of simple known construction clearly within the skill of the art.

Having thus described our invention fully and concisely, we note that many modifications and variations thereof will become apparent to those skilled in the art upon reading our disclosure. Accordingly, we do not wish to be limited to those embodiments specifically set out for the purpose of conciseness, but intend that all such modifications and variations thereof which are apparent to those of ordinary skill in the art be included within the scope of our invention which is defined by the following claims.

What is claimed is:

1. An apparatus for preparing simulated meat products which comprises:
   a. means for preparing at least one slurry comprising oil, water and heat coagulable protein;
   b. means for applying at least one layer of said slurry to a moving surface to form a layered mass of the slurry, and
   c. means, comprising a chamber with means for supplying steam and heated air thereto in proper proportions to attain a wet bulb temperature of from about 205° F to 212° F and a dry bulb temperature of from about 220° F to 280° F within the chamber, for subjecting the layered mass to moist heat to coagulate said heat coagulable protein therein without removing significant amounts of moisture therefrom.

2. An apparatus for preparing simulated meat products which comprises:
   a. means for preparing at least one slurry comprising oil, water and heat coagulable protein;
   b. means for applying at least one layer of said slurry to a moving surface to form a layered mass;
   c. a first heating means for heating the layered mass on said moving surface to coagulate said heat coagulable protein therein;
   d. means for cutting the layered mass into slices;
   e. means, comprising an endless belt supported by at least two rollers, for supporting the individual slices in non-overlapping relationship and for transporting said slices through a second heating means;
   f. a hold-down member hanging freely and supported by said slices on said supporting means during passage through said second heating means; and
   g. a second heating means for reducing the moisture content of the slices.

3. An apparatus according to claim 2 further including an oil spray means for spraying a mist of oil onto said slices prior to passage through said second heating means.

4. An apparatus according to claim 2 wherein the means for heating the layered mass to coagulate the protein comprises a chamber and means for supplying said chamber with steam and heated air.

* * * * *